United States Patent
Choi et al.

(10) Patent No.: US 8,174,997 B2
(45) Date of Patent: May 8, 2012

(54) COMMUNICATION METHOD AND APPARATUS USING RECEIVED SIGNAL STRENGTH INDICATOR IN WIRELESS SENSOR NETWORK

(75) Inventors: Hyo Hyun Choi, Seoul (KR); Sun Gi Kim, Seoul (KR); Lynn Choi, Seoul (KR); Sang Hoon Lee, Seoul (KR)

(73) Assignees: Samsung Electronics Co., Ltd., Maetan-dong, Yeongtong-gu, Suwon-si, Gyeonggi-do (KR); Korea University, Anam-Dong, Seongbuk-Gu, Seoul (KR)

( * ) Notice: Subject to any disclaimer, the term of this patent is extended or adjusted under 35 U.S.C. 154(b) by 165 days.

(21) Appl. No.: 12/370,683

(22) Filed: Feb. 13, 2009

(65) Prior Publication Data
US 2009/0207748 A1    Aug. 20, 2009

(30) Foreign Application Priority Data
Feb. 14, 2008    (KR) .................. 10-2008-0013470

(51) Int. Cl.
*H04L 12/26* (2006.01)
(52) U.S. Cl. .................. 370/252; 340/988; 701/200
(58) Field of Classification Search .................. 370/241, 370/252; 340/988–996; 342/104–158; 701/200–226
See application file for complete search history.

(56) References Cited

U.S. PATENT DOCUMENTS

| | | | | |
|---|---|---|---|---|
| 5,231,634 | A * | 7/1993 | Giles et al. | 370/348 |
| 6,466,905 | B1 * | 10/2002 | Pappas et al. | 704/227 |
| 2002/0191573 | A1 * | 12/2002 | Whitehill et al. | 370/338 |
| 2002/0196123 | A1 * | 12/2002 | Diehl et al. | 340/5.64 |
| 2005/0227703 | A1 * | 10/2005 | Cheng | 455/456.1 |
| 2006/0128317 | A1 * | 6/2006 | Halfmann et al. | 455/69 |
| 2007/0258420 | A1 * | 11/2007 | Alizadeh-Shabdiz et al. | 370/338 |
| 2008/0299927 | A1 * | 12/2008 | Tenbrook et al. | 455/226.2 |

* cited by examiner

*Primary Examiner* — Hassan Kizou
*Assistant Examiner* — Charles C Jiang
(74) *Attorney, Agent, or Firm* — Cha & Reiter, LLC

(57) ABSTRACT

A communication method and apparatus is disclosed that uses a received signal strength indicator (RSSI). In a sensor network including a plurality of nodes, a first node of the plurality of nodes receives a signal transmitted from a second node of the plurality of nodes, at least once. The first node also manages a link state with the second node according to the RSSI of the received signal. Therefore, the first node can receive signals from the plurality of nodes and then predict whether the second node moves. The first node can also predict a link state after the second node is moved so that communication can be performed through a link in a good state. Accordingly, the communication quality and the network performance of a network are enhanced.

14 Claims, 14 Drawing Sheets

COMMUNICATION METHOD AND APPARATUS USING RECEIVED SIGNAL STRENGTH INDICATOR IN WIRELESS SENSOR NETWORK

CLAIM OF PRIORITY

This application claims priority to an application entitled "COMMUNICATION METHOD AND APPARATUS USING RECEIVED SIGNAL STRENGTH INDICATOR IN WIRELESS SENSOR NETWORK" filed in the Korean Intellectual Property Office on Feb. 14, 2008 and assigned Serial No. 10-2008-0013470, the contents of which are incorporated herein by reference in its entirety.

BACKGROUND OF THE INVENTION

1. Field of the Invention

The present invention relates to wireless sensor networks. More particularly, the present invention relates to a communication method and apparatus using a received signal strength indicator (RSSI) of another node in a wireless sensor network.

2. Description of the Related Art

In recent years, wireless sensor network technology has been put to practical use in a variety of industrial fields. In particular, the steady growth of the Internet, combined the development of low-priced sensors, the changing environment of internal standards, etc., have been catalysts in the development of wireless sensor technology. Sensor networks detect information through sensors and processes the detected information, which in turn makes provides a variety of information for the application of science and technology to useful applications in both the household, in industry, and for personal enjoyment. Sensor networks refer to wireless networks that serve to implement ubiquitous computing and include a plurality of sensors that are light weight and energy efficient.

The conventional study of sensor networks has progressed in some areas but has been static with regard to studying the mobility of respective nodes in the sensor network and ways to benefit from such movement. Therefore, a MAC protocol applied to the conventional sensor network does take into consideration the mobility of any of the nodes.

On the contrary, sensor networks have characteristics where each network includes a plurality of sensors, and each of the sensor nodes has restricted power and computing capability, and the topology of the sensor network can be easily changed because sensor nodes are inserted into and removed from the network frequently, as some of the sensor nodes are moved.

FIG. 1A and FIG. 1B are views illustrating a topology of a conventional sensor network.

As shown in FIG. 1A, node 1 has its adjacent nodes 2~5. Node 1 includes nodes 2~5 in its adjacent node list and manages them. Managing the adjacent nodes includes detecting whether or not their power supply is turned on or off. As can be seen, node 6 is outside of the network.

Now referring to FIG. 1B, which may be considered a subsequent "snap shot" in time as compared with FIG. 1A, node 1 transmits data to node 3. However, at a the point in time that node 1 transmits data to node 3, node 3 moves out of the transmission range of node 1, and node 6 moves thereinto. In that case, although node 1 had to insert node 6 into its adjacent node list and to remove node 3 therefrom, it still maintains and manages nodes 2~5 therein. Since node 3 is included in the adjacent node list of node 1, node 1 attempts to re-transmit data to node 3 by a predetermined frequency, which causes an increase in unnecessary traffic.

SUMMARY OF THE INVENTION

The present invention provides a communication method and apparatus that determines whether respective nodes moves, measures the movement distance of the nodes, establishes a route and performs data transmission and data reception through the route, in a sensor network composed of the nodes having mobility.

According to an exemplary embodiment of the present invention, a communication method in a sensor network has a plurality of nodes, includes receiving, by one node (a first node) of the plurality of nodes, a signal from another node (a second node), at least once; and managing, by the one node, a link state with another node according to a received signal strength indicator (RSSI) of the received signal.

Preferably, the managing referred to above includes: distinguishing and storing RSSIs of said another node, based on signal-received times; and measuring and estimating link states using the stored RSSIs.

Preferably, the measuring and estimating link states may include: measuring and estimating a distance between the one node and said another node, a moving speed of said another node, and a moving start time point of said another node; and determining whether said another node moves.

Preferably, the distance between the one node and said another node is calculated by the relationship where the RSSI of the received signal is inversely proportional to square of the distance.

Preferably, determining whether said another node moves is performed by concluding that said another node moves on the basis of the RSSI of the received signal being changed, according to the time that the signal is received.

Preferably, the moving start time point of said another node is calculated by averaging a time point when the signal is received in the final stationary state and a time point when the signal is received in the first moving state.

Preferably, the one node predicts that said another node moves away from the one node if the RSSI is reduced according to the signal-received time, and that said another node moves closer to the one node if the RSSI is increased according to the signal-received time.

Preferably, the communication method further includes communicating, by the one node, with said another node according to the link state.

Preferably, if said another node moves out of the transmission range of the one node, the one node does not transmit a message to establish a route to said another node during the communication.

Preferably, if said another node moves out of the transmission range of the one node and the one node receives a message to establish a route from said another node, the one node does not transmit the received message to other nodes.

Preferably, if the other node moves out of the transmission range of the one node, communicating with said another node includes: transmitting, by the one node, an RTS to said another node, using a relay node that is one of the plurality of nodes; receiving, by the one node, a CTS according to the RTS, using the relay node; and transmitting, if the one node receives the CTS, data through the relay node.

Preferably, the relay node is located within the transmission range of the one node and said another node.

In accordance with another exemplary embodiment of the present invention, the present invention provides a communication apparatus in a sensor network comprising a plurality of nodes, wherein one of the plurality of nodes receives a signal transmitted from another node of the plurality of nodes, at least once, and manages a link state with said another node according to a received signal strength indicator (RSSI) of the received signal.

Preferably, the one node distinguishes and stores RSSIs of the other nodes, based on signal-received times.

Preferably, using the RSSIs, the one node measures and estimates a distance between the one node and said another node, a moving speed of the other node, and a moving start time point of the other node, and determines whether said another node moves.

Preferably, the one node calculates the distance between the one node and said another node, using the relationship where the RSSI of the received signal is inversely proportional to square of the distance.

Preferably, the one node concludes that said another node moves if the RSSI of the received signal is changed according to the time that the signal is received.

Preferably, the one node calculate the moving start time point of said another node by averaging a time point when the signal is received in the final stationary state and a time point when the signal is received in the first moving state.

Preferably, the one node predicts that said another node moves away from the one node if the RSSI is reduced according to the signal-received time, and that said another node moves closer to the one node if the RSSI is increased according to the signal-received time.

Preferably, the one node communicates with said another node according to the link state.

Preferably, if the link state with said another node is weak, the one node does not transmit a message to establish a route to said another node.

Preferably, if said another node moves out of the transmission range of the one node, and the one node receives a message to establish a route from said another node, the one node does not transmit the received message to the other nodes in the network.

Preferably, if the other node moves out of the transmission range of the one node, the one node exchanges an RTS and a CTS with said another node using a relay node that is one of the plurality of nodes. Said another node also transmits data through the relay node when the one node receives the CTS.

Preferably, the relay node is located within the transmission range of the one node and the other node.

BRIEF DESCRIPTION OF THE DRAWINGS

The features and advantages of the present invention will become more apparent from the following detailed description in conjunction with the accompanying drawings, in which.

DETAILED DESCRIPTION

Hereinafter, exemplary embodiments of the present invention are described in detail with reference to the accompanying drawings for explanatory purposes. The claimed invention is not limited to the examples shown and described herein. Detailed descriptions of well-known functions and structures incorporated herein may be omitted to avoid obscuring appreciation of the subject matter of the present invention by a person of ordinary skill in the art.

A wireless sensor network, hereinafter called a sensor network, includes a sink node and a sensor node. Respective nodes are wireless communication devices having a wireless interface for wireless communication. These respective nodes are subminiature low power devices and currently have a size of about 1 $mm^3$. These respective nodes may serve as a sensor node in terms of their functions. Each node typically includes a sensor for sensing particular data, an analog-to-digital (AD) converter for converting sensed data to digital signals, a processor for processing data, a memory, a battery for supplying power, and a wireless transceiver for transmitting/receiving data.

In addition, the respective nodes referred to in the above paragraph are deployed in a certain area, forming a network, and sense particular data from the area to provide them to a user.

Sensor nodes typically sense data relating to a geographical or an environmental change, for example, temperature, humidity, etc., on the area where they are installed. These sensor nodes have a limitation in terms of transmission range and thus transmit sensed data to a sink node. The sink node manages and controls the sensor nodes in the sensor network, and also collects data sensed by the sensor nodes. The sink node also transmits collected data to a gateway, where the gateway refers to a device that can transmit the sensed data to an external network, such as a host, etc. That is, the sensor network senses data through sensor nodes in a particular area, collects sensed data to the sink node, and transmits them to an external network, such as the Internet, etc., through the sink node. Consequently, a user can use the sensed data collected in the sensor network to for example, turning on heating, cooling, close shades, etc., once the information provided by the sensor nodes is analyzed.

In an exemplary embodiment of the present invention, since nodes have mobility, a node transmitting data preferably knows whether a node slated to receive the data moves. Respective nodes receive signals several times from their adjacent nodes within their transmission ranges, respectively, and determine whether their adjacent nodes move or have moved through the change in the received signal strength indicator (RSSI) of their received signals.

Therefore, each of the nodes determines whether its adjacent node moves or has moved and measures the distance to the adjacent node from each said node, through the RSSI of the signals received from the adjacent node.

Figure 1A:
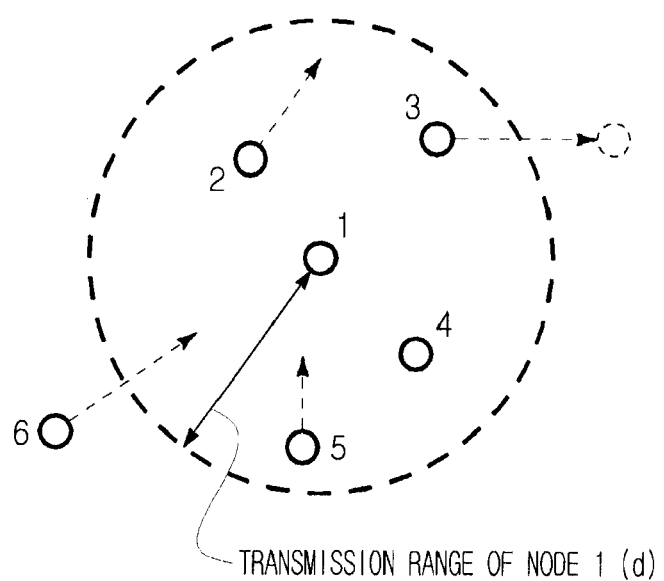
FIG. 1A and FIG. 1B are views illustrating a topology of a conventional sensor network.
Figure 1B:
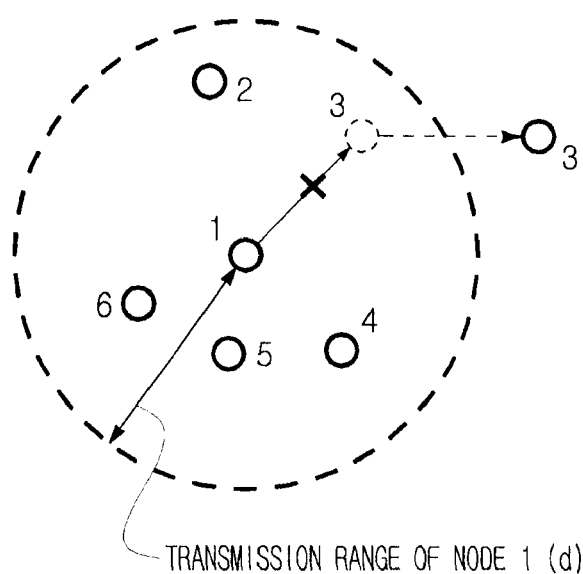
Figure 2:
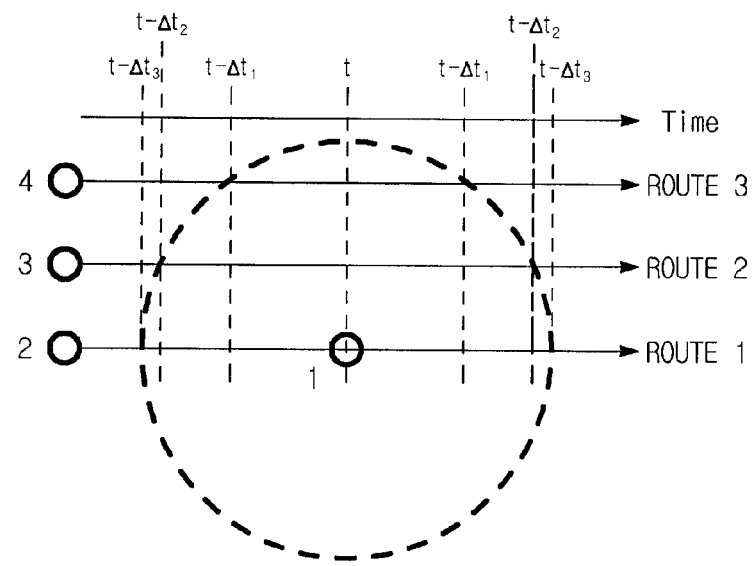
FIG. 2 is a view illustrating a method for determining whether a node moves and the distance it moves, according to an exemplary embodiment of the present invention.
Figure 3:
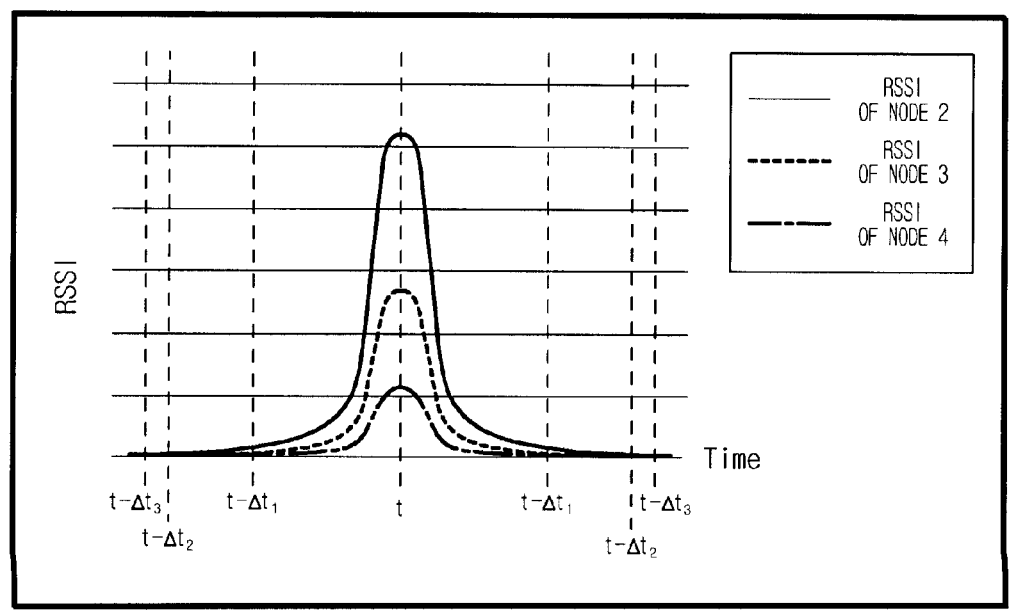
FIG. 3 is a graph illustrating a method for determining whether a node moves and the distance it moves, according to an exemplary embodiment of the present invention.

FIG. 2 is a view illustrating a method for determining whether a node moves and a distance that the node moves or has moved, according to an exemplary embodiment of the present invention. FIG. 3 is a graph illustrating a method for determining whether a node moves and the distance that it has or can move, according to an exemplary embodiment of the present invention.

Nodes 1~4 are shown in FIG. 2, where it is assumed that node 1 is in a non-movement state and nodes 2~4 are in a movement state. It is also assumed that node 2 moves along route 1, node 3 along route 2 and node 4 along route 3. Nodes 2~4 transmit signals several times to node 1 during the movement. Then, node 1 stores the RSSIs of received signals based on its signal-received time. FIG. 3 shows graphs of the RSSIs of signals that node 1 received from the respective nodes. As shown in FIG. 3, the RSSIs of received signals are different according to the distances between node 1 and each of nodes 2~4. The RSSI weakens as the distance between node 1 and each of nodes 2~4 increases. When node 1 ascertains that the RSSI of a signal received from one of nodes 2~4 is changed, it concludes that a corresponding node having transmitted the signal moves. As such, node 1 concludes that the weaker the RSSI of a signal received from one of the nodes, the farther the distance from node 1 is the node having transmitted the signal.

The method for measuring a distance using RSSI is explained in detail as follows. The following equations 1 and 2 are related to distance between nodes according to RSSIs.

$$Pr = (Pt \times Gt \times Gr \times ht^2 \times hr^2)/(d^4 \times L) \quad (1)$$

$$Pr \propto 1/d^2 \quad (2)$$

Wherein Pr denotes received power, Pt transmission power, Gt gain of a transmission antenna, Gr gain of a receiving antenna, ht height of a transmission antenna, hr height of a receiving antenna, d distance between nodes, and L is a constant.

In Equation 1, received power is proportional to each of (1) transmission power, (2) gain of a transmission antenna, (3) gain of a receiving antenna, (4) square of height of a transmission antenna, and (5) square of height of a receiving antenna, and inversely proportional to (1) the fourth power of distance between nodes. Here, L is set to one. Using Equation 1, RSSI can be calculated.

Since gain of a transmission antenna, gain of a receiving antenna, height of a transmission antenna, and height of a receiving antenna are characteristics of a system, they remain unchanged. In general, transmission power is also a fixed value. Therefore, Equation 2 can be derived from Equation 1. As described in Equation 2, receiving power is inversely proportional to a square of the distance. FIG. 3 shows graphs for the RSSIs of nodes 2~4 with respect to time, where a solid line denotes the RSSI of node 2, a broken line denotes the RSSI of node 3, and a dash-dot line denotes the RSSI of node 4. It will be appreciated that these respective RSSIs of signals received from nodes 2~4 are inversely proportional to the square of distance between node 1 and each of nodes 2~4.

In an exemplary embodiment of the present invention, signals received from the adjacent nodes are stored based on time, so that each of the movement states, moving time points and moving speeds of the adjacent nodes can be predicted. In order to perform these predictions, each time each of the nodes receives signals from its adjacent nodes, it stores the time and RSSI of the received signals in a table, which is hereinafter called a "history table."

Figure 4:
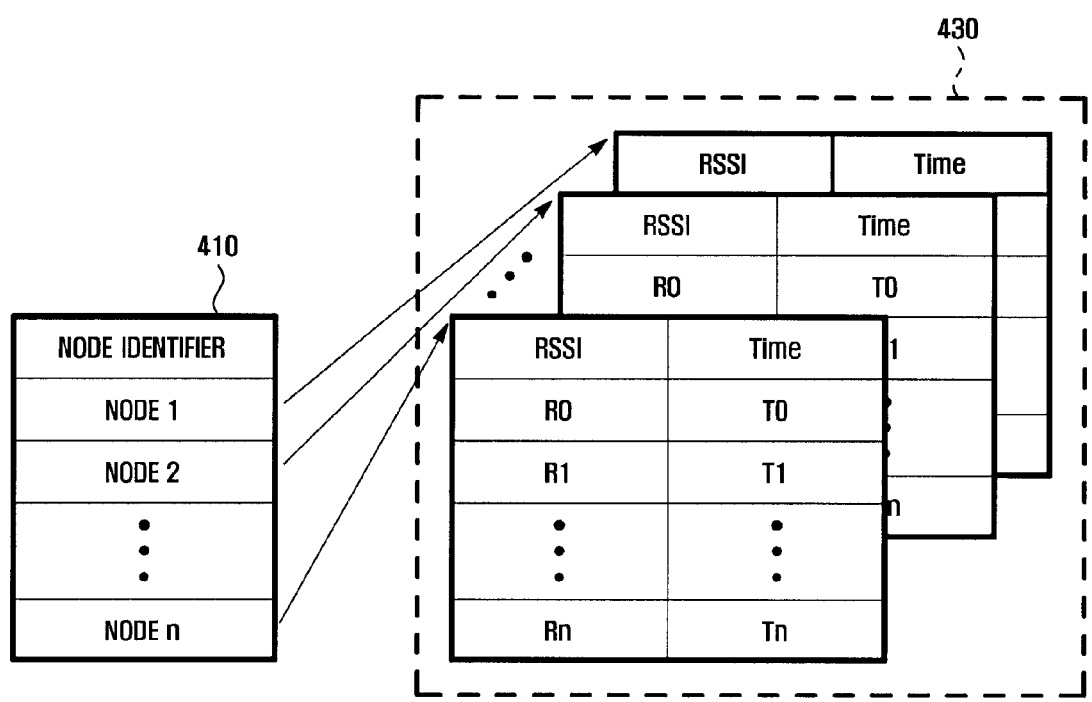
FIG. 4 is a view illustrating history tables according to an exemplary embodiment of the present invention.

FIG. 4 is a view illustrating history tables according to an exemplary embodiment of the present invention. Referring to FIG. 4, a node stores information regarding its adjacent nodes located within its transmission range and the RSSIs of signals received from the respective adjacent nodes based on time. That is, if a node has adjacent nodes whose number is n, it identifies and stores information about them through identifiers. If the node receives signals from nodes having identifiers, respectively, it stores the received times and RSSIs of the received signals. In FIG. 4, reference number 410 denotes a table storing the list of adjacent nodes having identifiers. Reference number 430 denotes respective tables storing received times and RSSIs of signals received from corresponding nodes. In an exemplary embodiment of the present invention, a node assigns identifiers to its adjacent nodes and then manages them. It also receives signals from its adjacent nodes and then stores RSSIs of the received signals according to time that it received the signals.

In order to measure and store an RSSI, a node must receive a signal from a corresponding node. If data transmission does not occur for a relatively long period of time, a prediction value for an RSSI can be derived through an old history node. In that case, an exemplary embodiment of the present invention measures and stores an RSSI using a signal of a sync packet. That is, in a sensor network environment, each of the nodes periodically transmits a sync packet to the other nodes in order to synchronize their clocks. Therefore, it is preferable to use an RSSI of a signal of a sync packet to determine whether adjacent nodes move.

Since clock drift of approximately 5 μm per second occurs in a clock generator, used in a general sensor node, such as an MICA mote, a clock difference, may be generated between two nodes, becomes maximally 600 μm per minute. If a sensor node has a data transmission rate of 20 kbps, 600 μm corresponds to a time for transmitting data of 1.5 bytes. Data are transmitted from a physical layer PHY to an MAC layer, based on bytes. Under such an assumption, a node must exchange a sync packet with another node once at approximately 40 sec in order to synchronize the nodes. Therefore, when an RSSI of an opposite node is measured using a sync packet, an RSSI can be measured every 40 seconds.

In an exemplary embodiment of the present invention, each of the nodes manages its adjacent nodes through usage of a history table. That is, in a sensor network, a node receives a signal from another node a number of times and manages a history table. A node can use this history table to manage link states with other nodes. The history table is used to predict or calculate a distance between a node and said another node, a speed of said another node and to determine whether said another node moves.

Figure 5:
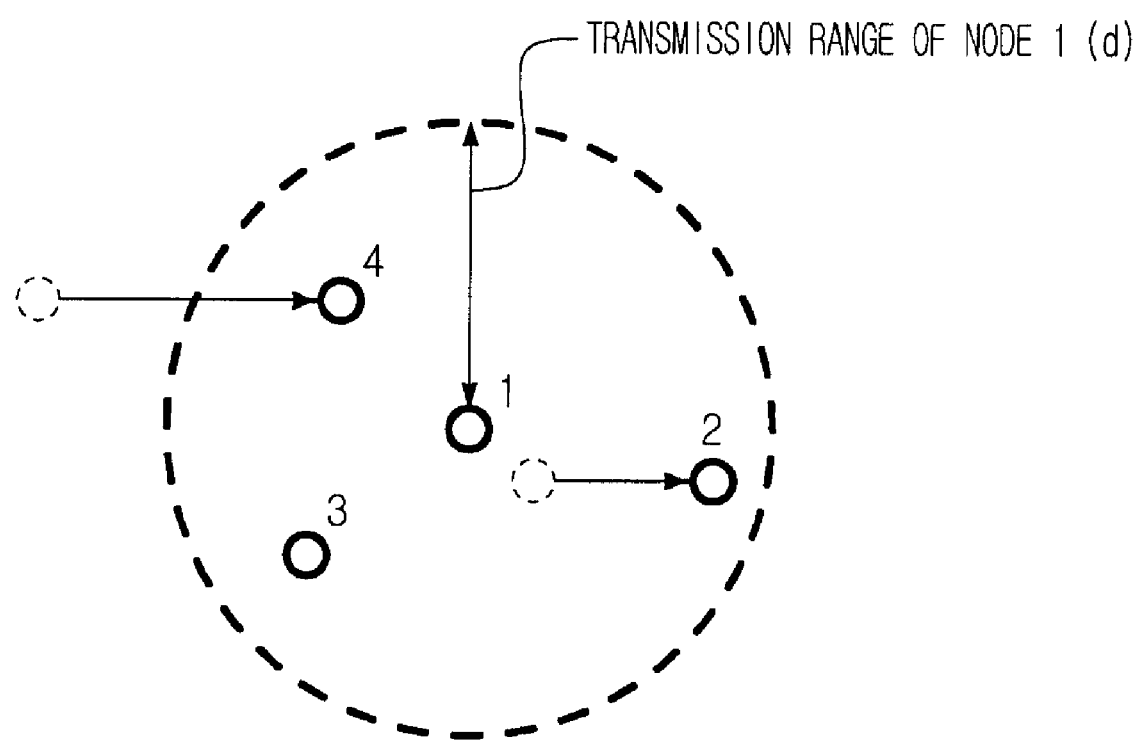
FIG. 5 is a view illustrating a method for managing adjacent nodes using a history table, according to an exemplary embodiment of the present invention.
Figure 6:
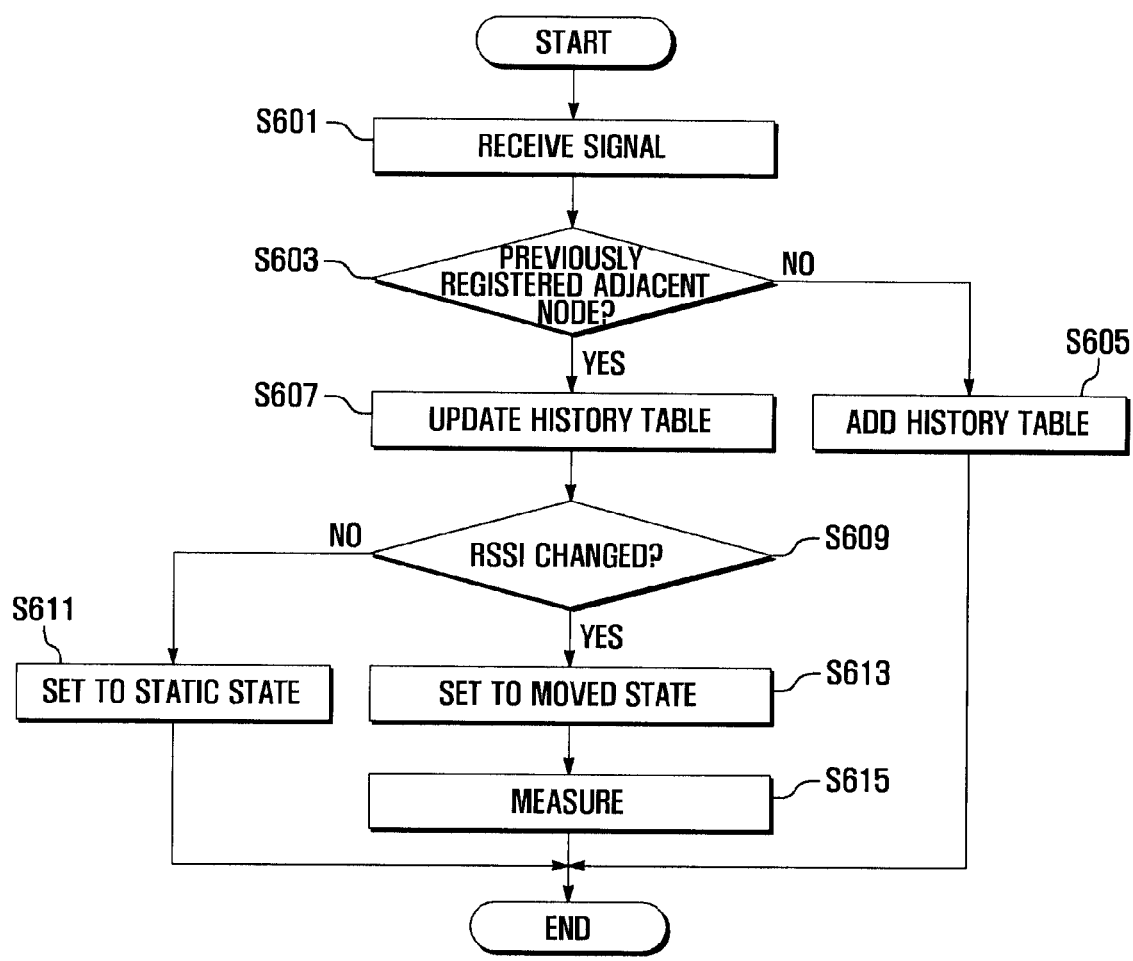
FIG. 6 is a flow chart illustrating exemplary operation of a method for managing adjacent nodes using a history table, according to an exemplary embodiment of the present invention.

FIG. 5 is a view illustrating a method for managing adjacent nodes using a history table, according to an exemplary embodiment of the present invention. FIG. 6 is a flow chart illustrating exemplary operation of a method for managing adjacent nodes by using a history table, according to an exemplary embodiment of the present invention.

FIG. 5 shows nodes 1~4. In a flow chart of FIG. 6, it is assumed that node 1 receives signals from nodes 2~4, however, it should be understood that any of nodes 2~4 can also be operated as node 1. In FIG. 5, nodes 2 and 3 are located within the transmission range d of node 1, so that they are registered, as an adjacent node, to node 1. In that case, node 1 has history tables for nodes 2 and 3. It is assumed that node 2 is moving along route 1 and node 3 is in a non-movement state. It is also assumed that node 4 is moving into the transmission range d of node 1 from the outside of the transmission range d.

Referring now to FIG. 6, node 1 receives signals from the other nodes 2~4 (S601). When node 1 receives a signal, it determines whether a node transmitting the signal is a registered adjacent node (S603).

At (s603), If node 1 ascertains that the node transmitting the signal is not a node registered thereto, it adds a history table for the node, not registered, thereto, an example of which is a case where node 4 moves into the transmission range of node 1 and then transmits a signal to node 1, as shown in FIG. 5. In that case, node 1 assigns an identifier to node 4 and records the received time and RSSI of a signal corresponding to the identifier therein. On the contrary, if node 1 ascertains that the node transmitting the signal is an adjacent node registered thereto at S603, it updates its history table (S607) for that particular node. That is, node 1 adds a signal received time and an RSSI of a received signal to its history table, an example of which is a case where node 1 receives a signal from node 2 or 3, as shown in FIG. 5.

After updating the history table, node 1 compares the RSSI of a received signal with that of a previously received signal and determines whether or not there is a change in the RSSI of a corresponding node (S609). If the RSSI of a corresponding node is unchanged at S609, node 1 sets a state of the corresponding node to a stationary state (S611) and then terminates the procedure, an example of which is a case where, since node 3 does not move, the RSSI of a signal transmitted from node 3 is unchanged, as shown in FIG. 5. Therefore, node 1 sets node 3 to a stationary state. On the contrary, if the RSSI of a corresponding node is changed at S609, node 1 sets a state of the corresponding node to a moving state (S613), an example of which is a case where, if node 1 receives a signal from node 2, moving away from node 1, the RSSI of the signal is gradually reduced, as shown in FIG. 5. Therefore, node 1 sets the state of node 2 to a moving state.

After node 1 sets the state of node 2 to a moving state, node 1 derives a moving start time point and a moving speed of a node in a moving state (S615). It is preferable to derive a moving start time point once at the initial point when a stationary state is changed into a moving state. The moving start time point refers to a time point when a node starts to move. In the following description, a method for calculating a moving start time point is explained. In an exemplary embodiment of the present invention, the moving start time point refers to a time point when a stationary state is changed into a moving state.

The following Table 1 provides an example of a history table for calculating a moving start time point of a node according to the present invention.

TABLE 1

| RSSI (dbm) | Received time |
|---|---|
| 10 | t1 |
| 10 | t2 |
| 30 | t3 |
| 50 | t4 |
| ... | ... |

In Table 1, it is assumed that a node receives a signal four times from the other node between time t1 and t4. RSSI is unchanged at t1 and t2 and changed at t3. In that case, the node receiving the signal concludes that the other node moves at the mid time between t2 and t3 and then calculates the moving start time point using the following Equation 3.

$$\text{Moving start time point} = (t2+t3)/2 \tag{3}$$

As can be understood from Equation 3, the moving start time point is calculated by averaging a time point t2 that a signal receives in the final stationary state and a time point t3 that a signal receives in the first moving state.

As described above, according to an exemplary embodiment of the present invention, it is determined whether the other node moves and a distance between a node and the other node can be calculated. A node can store signals from the other node base on the signal-received times. Accordingly, the node can learn the distance and time that the other node moves and thus calculate the moving speed of the other node.

As described above, a node can learn whether its adjacent node moves. In the following description, there is an explanation regarding an exemplary method where a node establishes a route and transmits data, according to whether its adjacent node moves. These examples are conducted while a node manages the states of its adjacent nodes, using the history tables described above, in a sensor network according to an embodiment of the present invention.

In an exemplary embodiment of the present invention, a node in a network can remove a corresponding node from its list of adjacent nodes according to whether the corresponding node moves, and can cancel data transmission to the corresponding node. That is, a node can remove an adjacent node from transmission by moving away from the node, and removing the adjacent node from its adjacent node list, and by canceling data transmission to the removed node.

Figure 7:
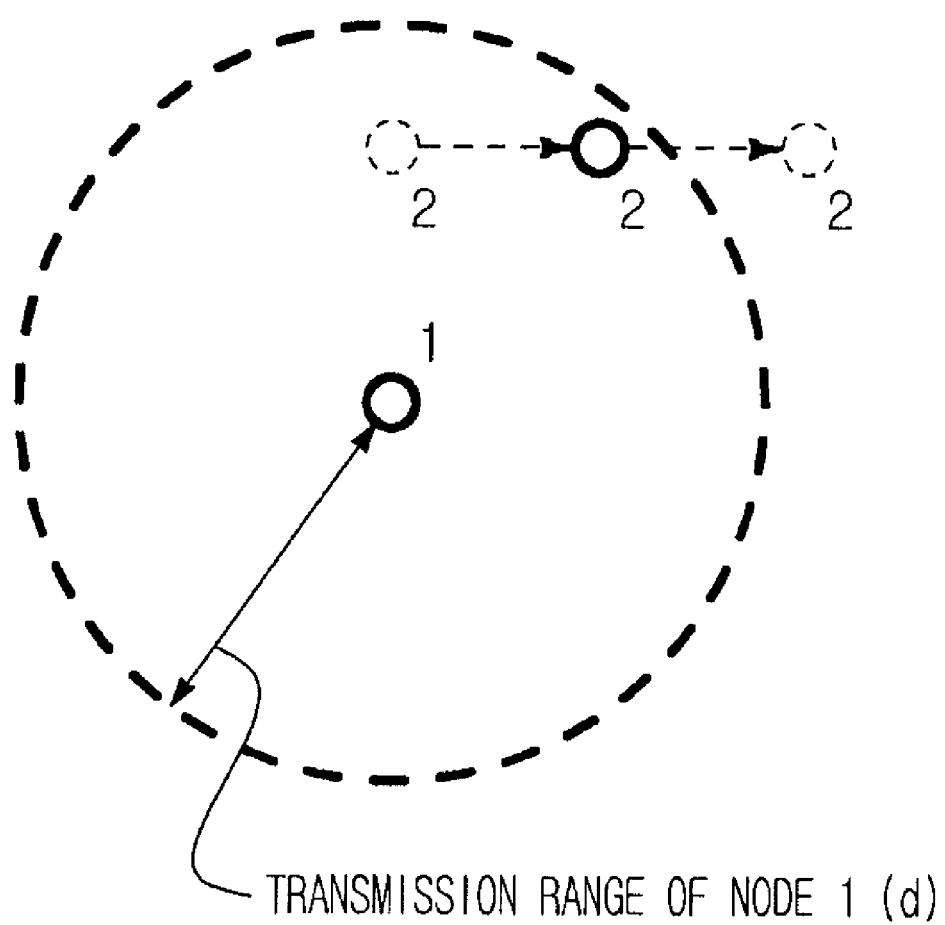
FIG. 7 is a view illustrating a method where a node transmits a message to establish a route to the other node, according to an exemplary embodiment of the present invention.
Figure 8:
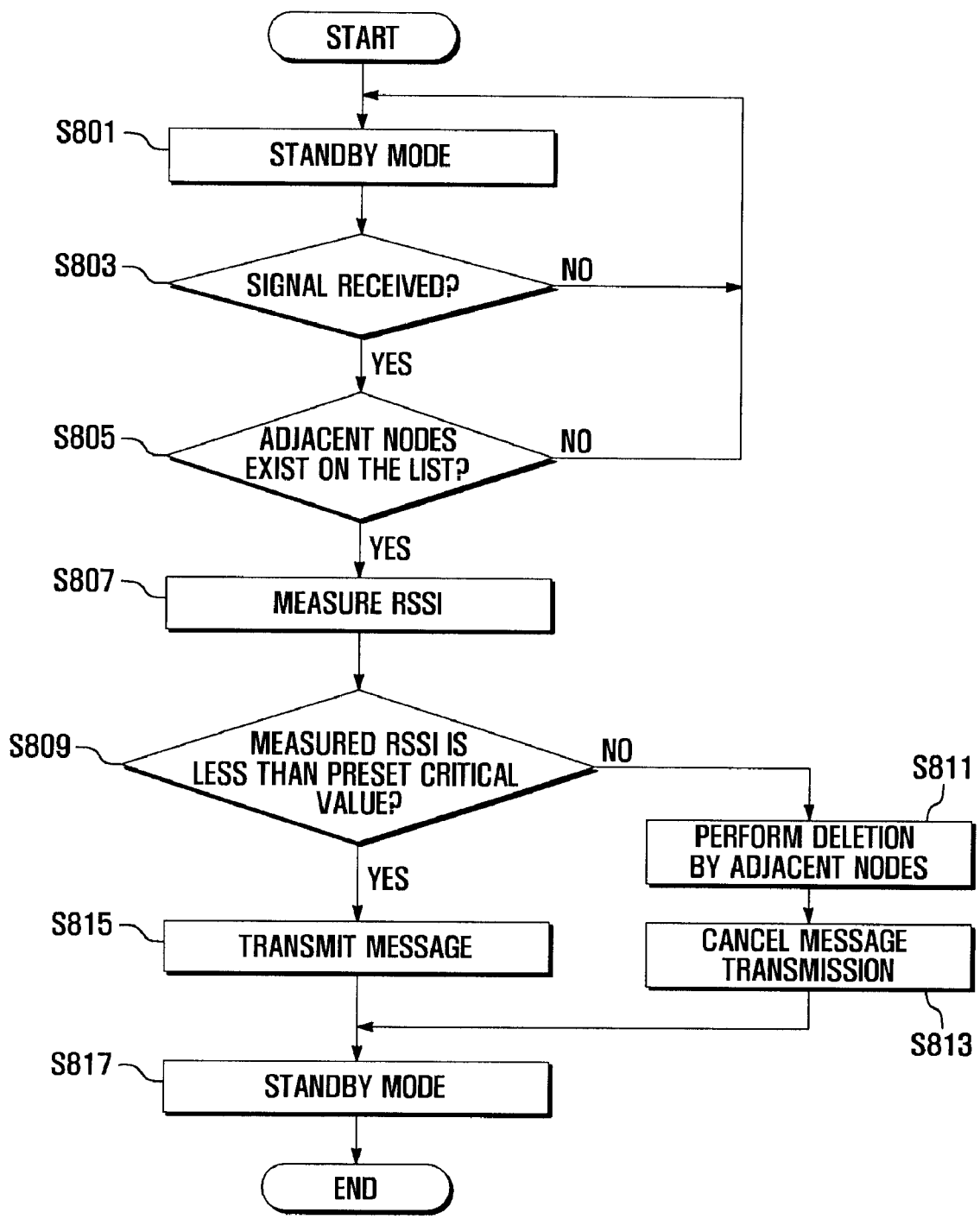
FIG. 8 is a flow chart illustrating exemplary operation of a method where one of the nodes transmits a message to establish a route to the other node, according to an exemplary embodiment of the present invention.

FIG. 7 is a view illustrating exemplary operation of a method where a node transmits a message to establish a route with to the other node, according to an exemplary embodiment of the present invention. FIG. 8 is a flow chart illustrating exemplary operation of a method where a node transmits a message to establish a route to the other node, according to an exemplary embodiment of the present invention.

FIG. 7 shows nodes 1 and 2, where it is assumed that node 2 is an adjacent node of node 1. It is also assumed that node 2 is moving out of the transmission range of node 1. In this particular case, node 1 seeks to transmit a message for establishing a route to node 2. Examples of a message for establishing a route may be a routing request message RREQ, a routing response message RREP, etc. If node 1 receives a signal from node 2 and learns that node 2 moved out of its transmission range, node 1 then removes node 2 from its adjacent node list. Therefore, node 1 does not transmit a message to node 2.

Referring now to FIG. 8, node 1 is in a standby state (S801). During the standby mode at S801, node 1 determines whether a signal has been received from one of its adjacent nodes (S803). While node 1 is not receiving a signal from its adjacent nodes, it maintains a standby state at S801. When node 1 receives a signal at S803, it determines whether a node having transmitted the signal is in its adjacent node list (S805). When node 1 ascertains that the node having transmitted the signal is not in its adjacent node list at S805, it maintains a standby state at S801. On the contrary, when node 1 ascertains that the node having transmitted the signal is in its adjacent node list at S805, it measures an RSSI of the received signal (S807).

After that, node 1 determines whether the RSSI is less than a preset critical value (S809). If the RSSI is less than a preset critical value at S809, node 1 removes the node having transmitted the signal from its adjacent node list (S811). After that, node 1 cancels data transmission (S813) and then enters a standby mode (S817).

On the other hand, if the RSSI from the node having transmitted the signal is equal to or greater than a preset critical value at S809, node 1 transmits a message to the node (S815) and then enters a standby mode at 817.

In an exemplary embodiment of the present invention described above, a node operation was explained where a node transmits a message to the other node. In the following description, a node operation is explained focusing on a node that receives a message.

In order to establish a route in a network, a routing request message or a routing response message is transmitted by a broadcast method. A plurality of relay nodes is required to transmit a routing request message to a destination node. That is, a corresponding message is relayed through a plurality of nodes until it arrives at a destination node from the first transmission node. In an exemplary embodiment of the present invention, a routing request message or a routing response message, received from a node whose link state is weak, is not transmitted. In that case, since a plurality of nodes exists in a sensor network, a corresponding message may be transmitted through another route. Such a link state can be checked by measuring an RSSI.

Figure 9:
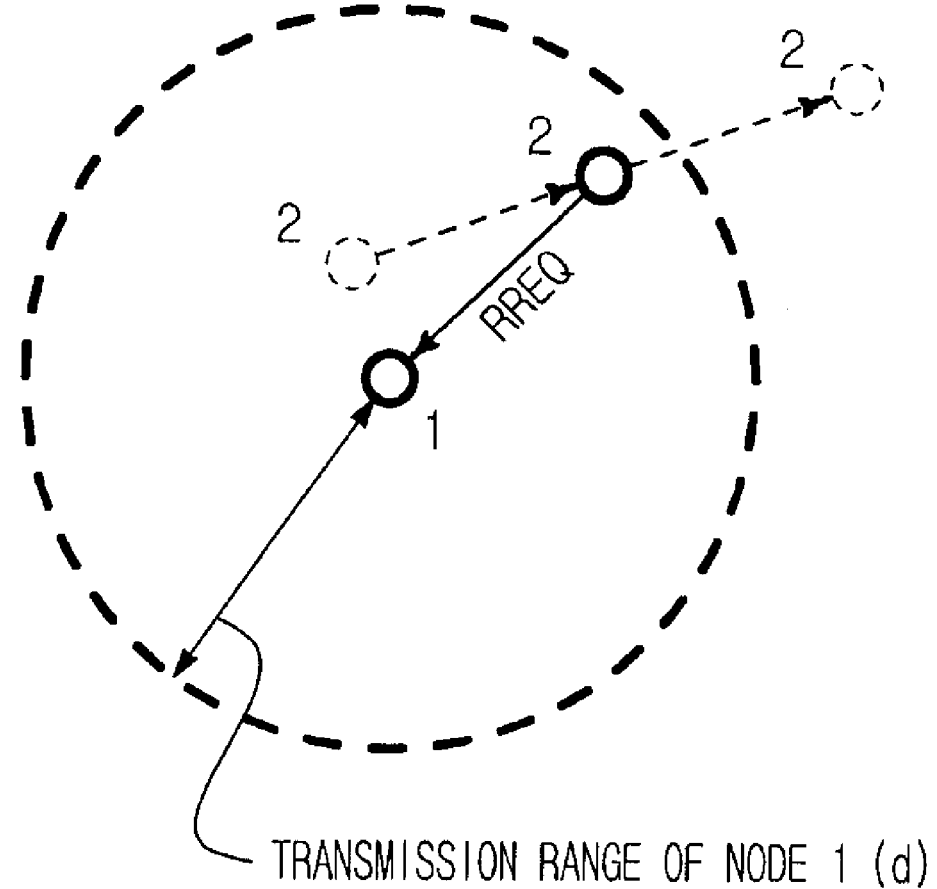
FIG. 9 is a view illustrating a method for receiving and transmitting a message, according to an exemplary embodiment of the present invention.
Figure 10:
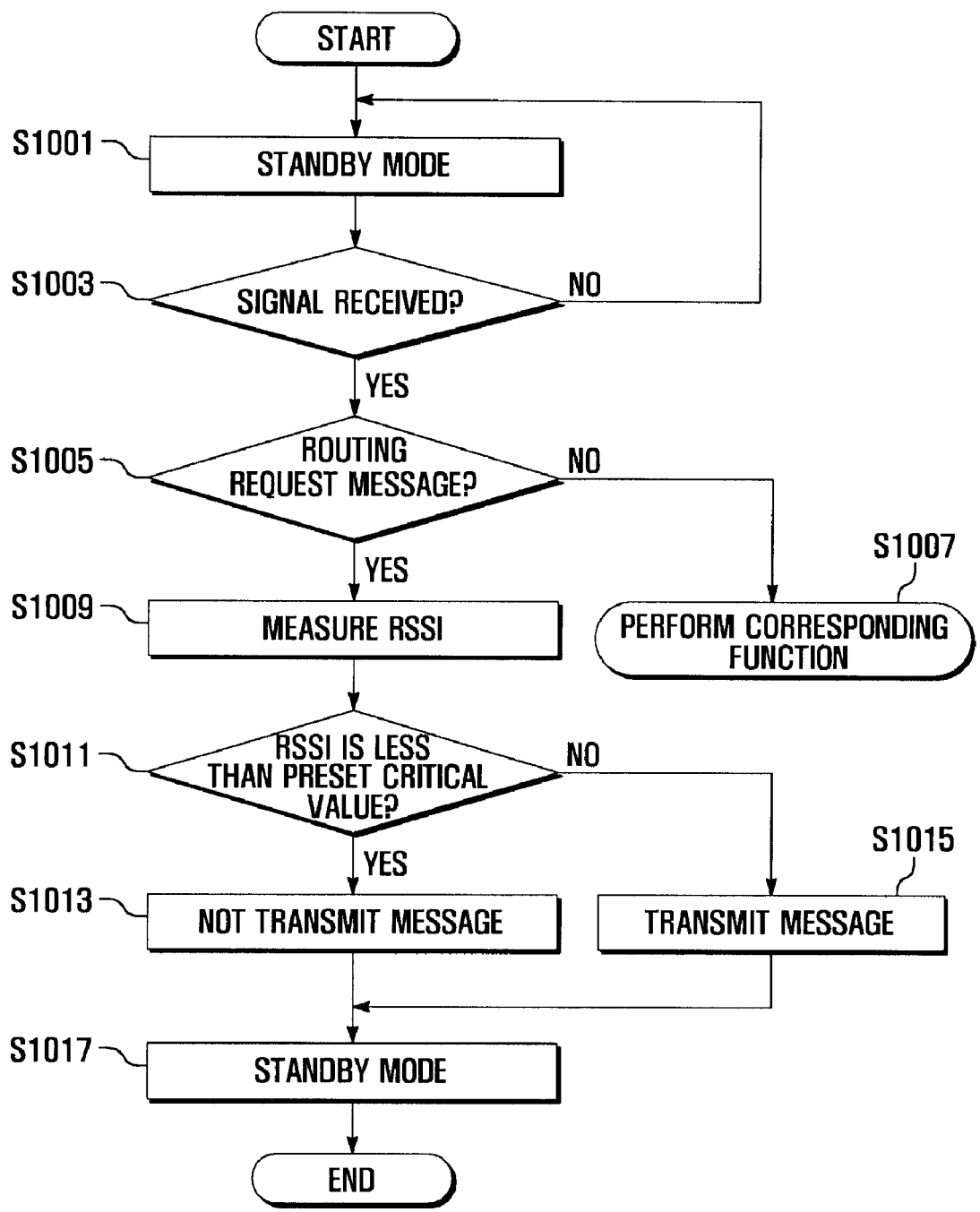
FIG. 10 is a flow chart illustrating exemplary operation of a method for receiving and transmitting a message, according to an exemplary embodiment of the present invention.

FIG. 9 is a view illustrating a method for receiving and transmitting a message, according to an exemplary embodiment of the present invention. FIG. 10 is a flow chart describing a method for receiving and transmitting a message, according to an exemplary embodiment of the present invention. In the following description, the method is explained, using a routing request message as an example.

FIG. 9 shows nodes 1 and 2, where node 2 is currently moving out of the transmission range of node 1. It is assumed that node 2 transmitted a routing request message to node 1. Node 1 determines that node 2 is moving out of its transmission range through the RSSI of the routing request message. In that case, since a link state may be weak or the link is not connected to node 2, node 1 does not transmit a routing request message to the other node.

Referring to the flow chart in FIG. 10, node 1 is initially in a standby mode (S1001). During the standby mode at S1001, node 1 determines whether to receive a signal from the other nodes (S1003). While node 1 is not receiving a signal, it stays in a standby mode at S1001. When node 1 receives a signal from the other nodes at S1003, it determines whether the signal is a routing request message (S1005). If node 1 ascertains that the signal is not a routing request message at S1005, it performs a function corresponding to the signal (S1007). On the contrary, if node 1 ascertains the signal is a routing request message at S1005, it measures an RSSI of the signal (S1009). Node 1 then determines whether the value of the RSSI is less than a preset critical value (S1011). If the value of the RSSI is less than a preset critical value at S1011, Node 1 does not transmit the received message to the other node (S1013) and then enters a standby mode (S1017). On the contrary, if the value of the RSSI is equal to or greater than a preset critical value at S1011, Node 1 relays the received message to the other nodes (S1015) and then enters a standby mode at S1017.

Figure 11A:
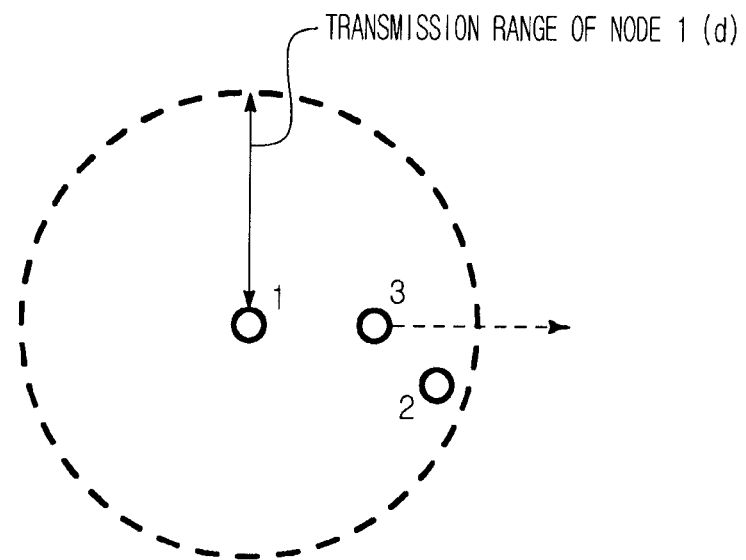
FIG. 11A and FIG. 11B are views illustrating a method for transmitting and receiving data by a node, according to an exemplary embodiment of the present invention.
Figure 11B:
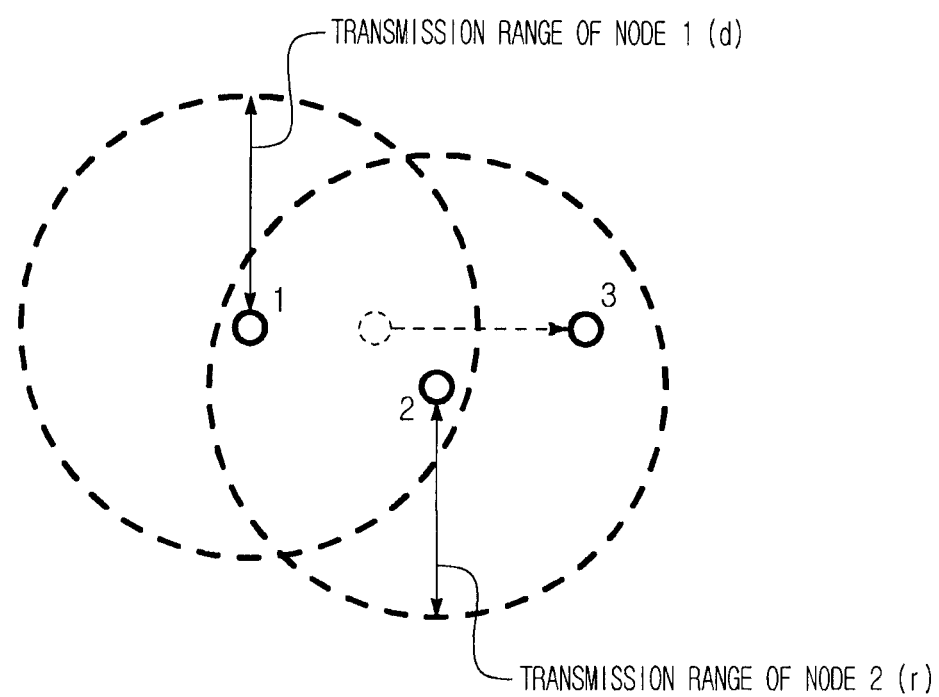
Figure 12:
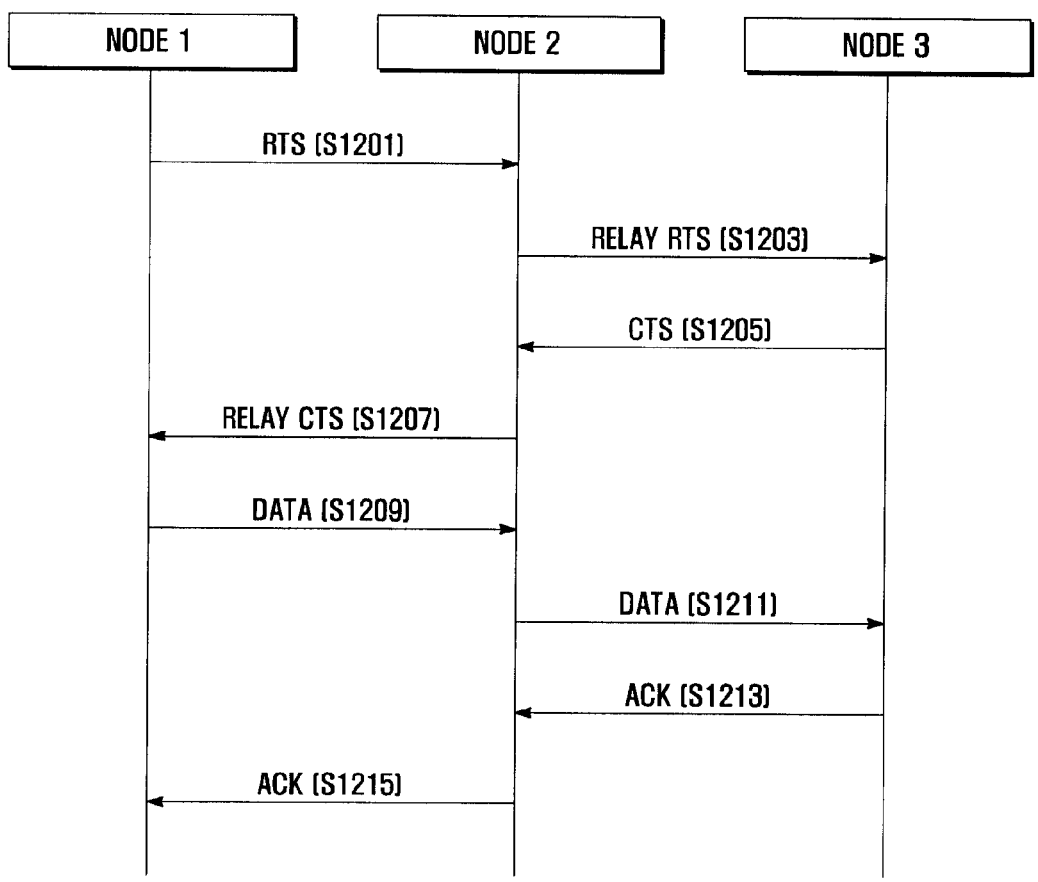
FIG. 12 is a signal flow chart illustrating exemplary operation of a method for transmitting and receiving data by a node, according to an exemplary embodiment of the present invention.

In the following description, an exemplary data transmitting and receiving method is explained in more detail. FIG. 11A and FIG. 11B are views a method for transmitting and receiving data by a node, according to an exemplary embodiment of the present invention. FIG. 12 is a signal flow chart illustrating exemplary operation of a method for transmitting and receiving data by a node, according to an exemplary embodiment of the present invention. In order to focus clearly on the subject of the present invention, descriptions will be omitted which related to wait interval, such as a short interframe space (SIFS), distributed interframe space (DIFS), etc., after transmitting and receiving an RTS, an CTS, data, and ACK.

FIG. 11A shows nodes 1~3. Node 1 prepares to transmit data to node 3. Nodes 2 and 3 are within the transmission range of node 1 and adjacent nodes of node 1. It is assumed that node 3 is currently moving out of the transmission range of node 1. If node 3 moves outside the transmission range of node 1, node 1 cannot directly transmit data to node 3. In that case, as shown in FIG. 11B, node 1 transmits data to node 3 through node 2.

Referring to FIG. 11B and FIG. 12, node 1 broadcasts an RTS in order to transmit data (S1201). As shown in FIG. 11B, node 3 cannot directly receive the RTS but node 2 can receive the RTS because node 2 is still within the transmission range of node 1. Therefore, node 2 receives the RTS. Then, since the destination node 3 is a receivable node as an adjacent node of node 2, node 2 broadcasts a relay RTS (S1203). The relay RTS, distinguished from an RTS, refers to an RTS transmitted by a transmission node. Since transmission is performed by a broadcast method, node 1 can also receive an RTS. Node 3 receiving an RTS broadcasts a CTS (S1205) and thus node 2 receives it. Node 2 receiving a CTS transmits a relay CTS to node 1 (S1207). Since the relay CTS is transmitted by a broadcast method, node 3 can also receive the relay CTS. After receiving the relay CTS, node 1 transmits data to node 2 (S1209), and node 2 transmits the data to node 3 (S1211). After receiving data, node 3 transmits an ACK to node 2 (S1213) and node 2 then transmits an ACK to node 1 (S1215).

Figure 13:
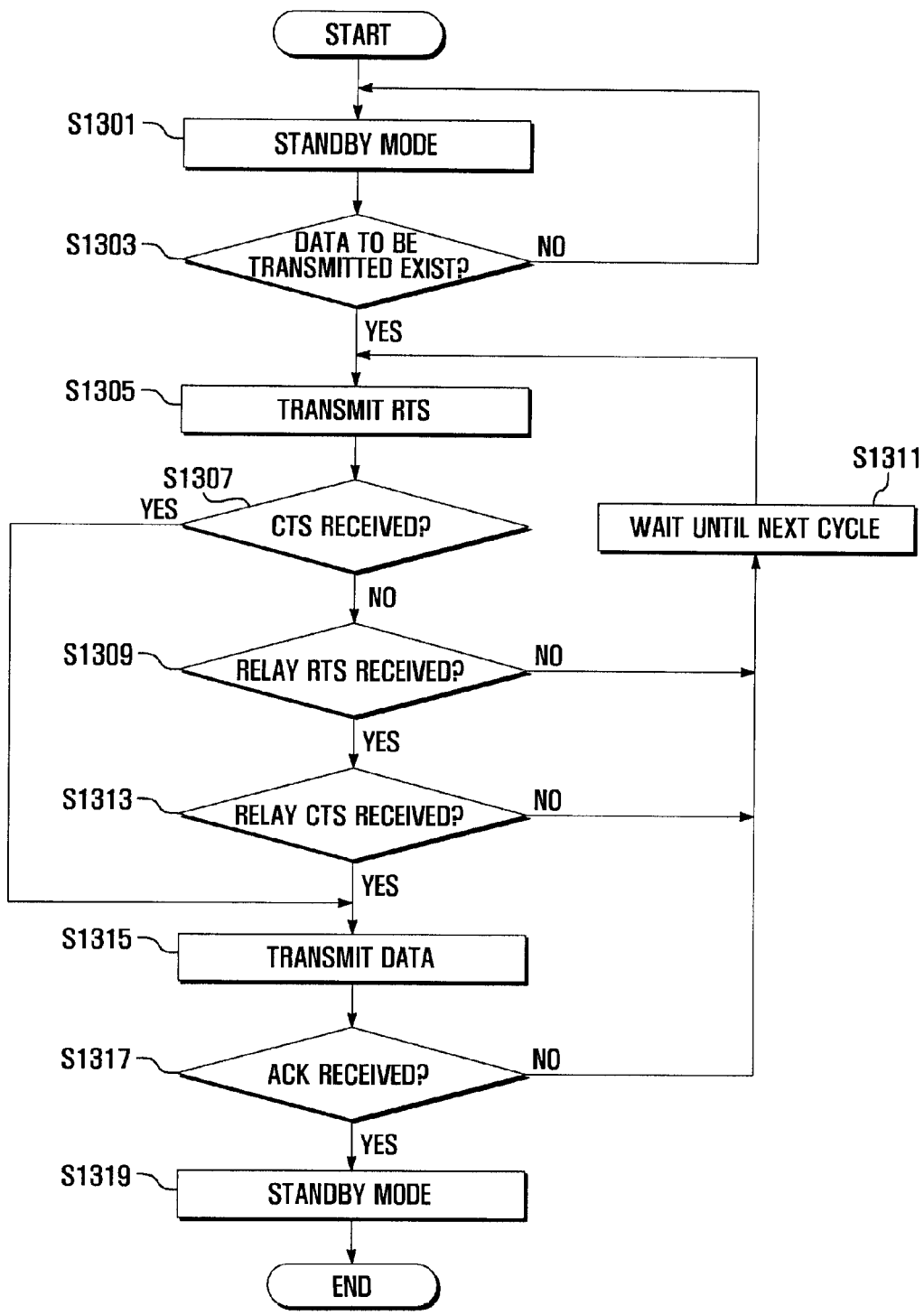
FIG. 13 is a flow chart illustrating exemplary operation of a method for transmitting data by a node, according to an exemplary embodiment of the present invention.
Figure 14:
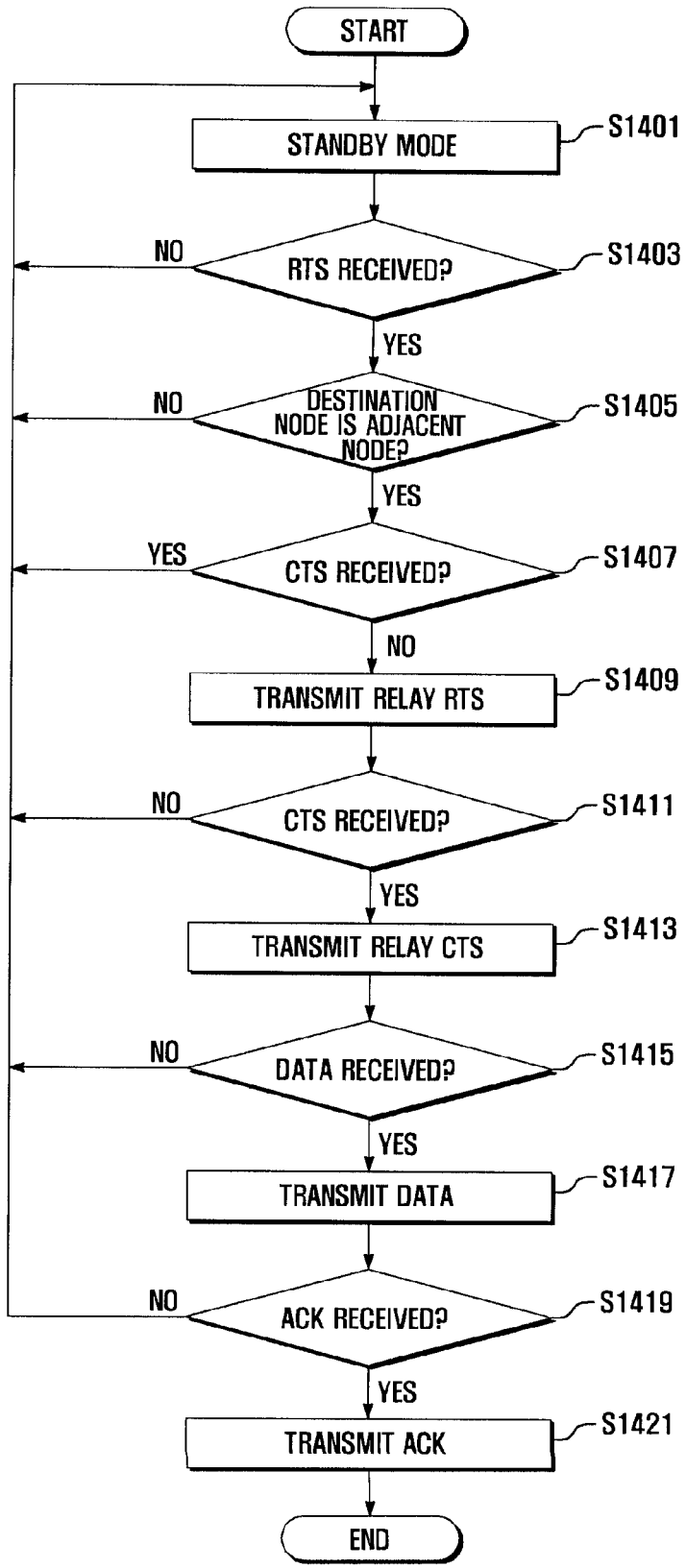
FIG. 14 is a flow chart illustrating exemplary operation of a method for relaying data by a node, according to an exemplary embodiment of the present invention.
Figure 15:
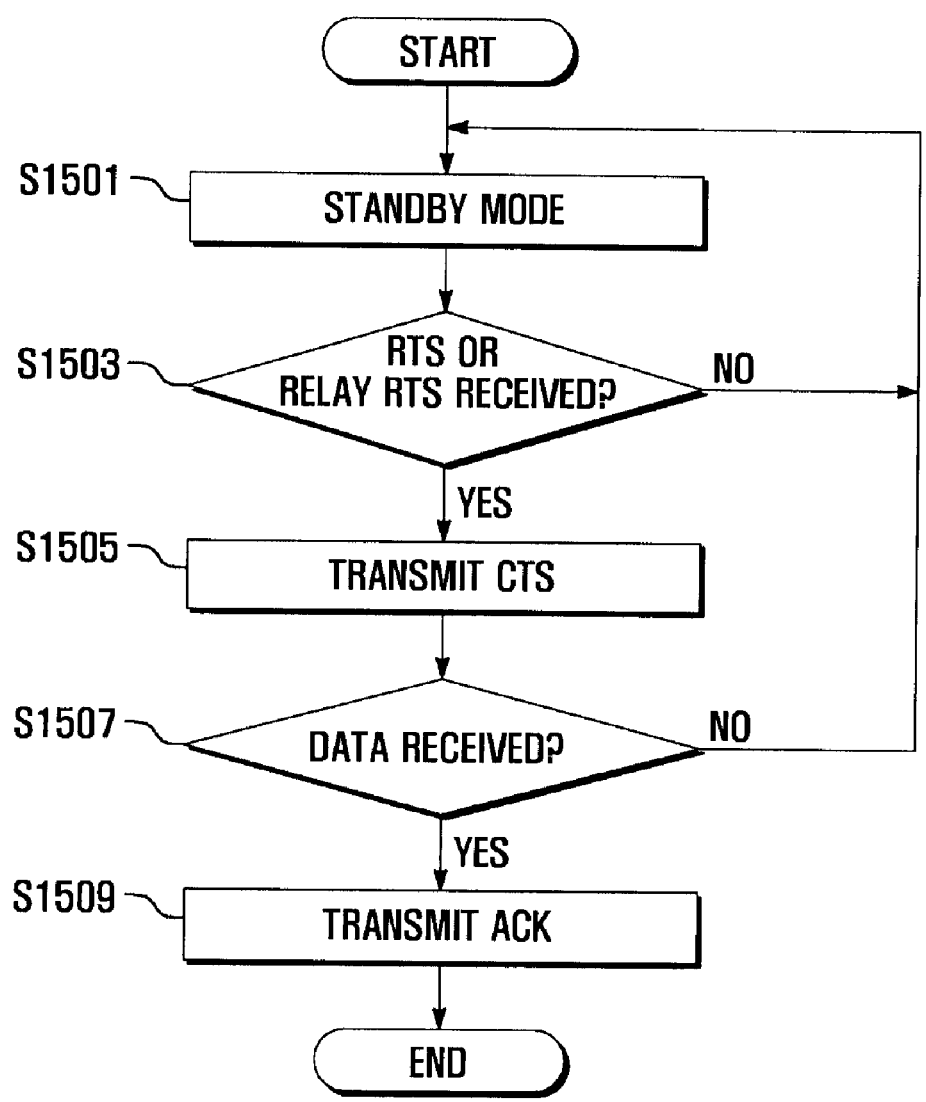
FIG. 15 is a flow chart illustrating exemplary operation of a method for receiving data by a node, according to an exemplary embodiment of the present invention.

In the following description, transmission node, relay node, and reception node are explained, in terms of their operations, with reference to FIGS. 13 to 15. FIGS. 13 to 15 show flow charts that describe respective nodes in FIGS. 11A and 11B and FIG. 12. FIG. 13 is a flow chart illustrating exemplary operation of a method for transmitting data by a node, according to an exemplary embodiment of the present invention. FIG. 14 is a flow chart illustrating exemplary operation of a method for relaying data by a node, according to an exemplary embodiment of the present invention. FIG. 15 is a flow chart illustrating exemplary operation of a method for receiving data by a node, according to an exemplary embodiment of the present invention.

Hereinafter, for convenient description, a node that transmits data is called a transmission node, which is similar to node 1 described above. In addition, a node that relays data is called a relay node, which is similar to node 2 described above, and a node that receives data is called a reception node, which is similar to node 3 described above.

First, an operation of a transmission node is explained. Referring now to FIG. 13, the transmission node performs a standby mode (S1301). The transmission node determines whether there are data to be transmitted (S1303). The data may be particular data collected by a sensor of the transmission node. When data are generated at S1303, the transmission node broadcast an RTS (S1305).

Next, the transmission node determines whether to receive a CTS (S1307). If the transmission node receives a CTS at S1307, the transmission node transmits data (S1315).

On the contrary, if the transmission node does not receive a CTS at 1307, it determines whether to receive a relay RTS (1309). When the transmission node does not receive a relay RTS at S1309, the transmission node waits until the next cycle (S1311) and then proceeds to S1305 to re-transmit data.

On the contrary, when the transmission node receives a relay RTS at 1309, the transmission node determines whether to receive a relay CTS (S1313). If the transmission node does not receive a relay CTS at S1313, it waits until the next cycle at S1311 and then proceeds to S1305 to re-transmits data. When the transmission node receives a relay CTS at S1313, the transmission node transmits data (S1315). After that, the transmission node determines whether to receive an ACK in response to the transmission of data (S1317). If the transmission node receives an ACK at S1317, the transmission node enters a standby mode (A1319). On the contrary, if the transmission node does not receive an ACK at S1317, the node waits until the next cycle at S1311 and then proceeds to S1305 to re-transmit data.

Second, an operation of a relay node is explained. Referring to FIG. 14, the relay node performs a standby mode (S1401). The relay node determines whether to receive an RTS from a transmission node (S1403). If the relay node does not receive an RTS at S1403, the relay then maintains a standby state at S1401. If the relay node receives an RTS at S1403, the relay node determines whether a destination node of the received RTS is its adjacent node (S1405). When the relay node ascertains that the destination node is not its adjacent node at S1405, the relay node enters a standby mode at S1401. On the contrary, when the destination node is the adjacent node of the relay node at S1405, the relay node determines whether to receive a CTS (S1407). If a reception node as a destination node is located within the transmission range of the transmission node, the relay node can receive a CTS from the reception node, at S1407, because the CTS is broadcasted. In that case, the relay node enters a standby mode at S1401. On the contrary, when the relay node does not receive a CTS at 1407, the relay node broadcasts a relay RTS corresponding to the RTS received at S1403 (S1409).

After that, the relay node determines whether to receive a CTS according to the relay RTS (S1411). If the relay node does not receive a CTS at S1411, the relay node enters a standby mode at S1401. If the relay node receives a CTS at S1411, the relay node transmits a relay CTS to the transmission node (S1413).

Next, the relay node determines whether to receive data according to the relay CTS (S1415). If the relay node does not receive data at S1415, the relay node enters a standby mode at S1401.

On the contrary, if the relay receives data at S1415, it transmits data to the reception node (S1417) and then determines whether to receive an ACK according to transmission of data (S1419). If the relay node receives an ACK at a S1419, the relay node transmits an ACK to the transmission node (S1421). When the relay node does not receive an ACK at S1419, the relay node enters a standby mode at S1401.

Third, an operation of a reception node is explained. Referring to FIG. 15, the reception node performs a standby mode (S1501). The reception node determines whether to receive an RTS or a relay RTS (S1503). If the reception node is located within the transmission range of a transmission node, it can directly receive an RTS. Otherwise, it can receive a relay RTS from a relay node. When the reception node does not receive an RTS or a relay RTS at S1503, it enters a standby mode at S1501. On the contrary, when the reception node receives an RTS or a relay RTS at S1503, the reception node transmits a CTS (S1505). In detail, if the reception node receives an RTS, the CTS may be directly transmitted to the transmission node, and if the reception node receives a relay RTS, the CTS may be transmitted to the transmission node through a relay node.

After that, the reception node determines whether to receive data according to transmission of a CTS (S1507). When the reception node receives data at S1507, the reception node transmits an ACK in response to reception of data (S1509). On the contrary, when the reception node does not receive data at S1507, the reception node enters a standby mode at S1501.

As described above, since the communication method and apparatus according to the present invention can receive signals from the other nodes, and then predict whether the other node moves or measures the movement of the node, and can predict a link state after the other node is moved. Therefore, the communication method and apparatus can select a link in a good state and allow communication to be performed therethrough. Accordingly, the communication quality and the network performance of a network are enhanced.

Although exemplary embodiments of the present invention have been described in detail hereinabove, it should be understood that many variations and modifications of the basic inventive concept herein described, which may be apparent to those skilled in the art, will still fall within the spirit and scope of the exemplary embodiments of the present invention as defined in the appended claims.

What is claimed is:

1. A communication method in a sensor network including a plurality of nodes, comprising:
   receiving, by a first node of the plurality of nodes, a signal from a second node, at least once; and
   managing, by the first node, a link state with the second node according to a received signal strength indicator (RSSI) of the received signal, said managing comprising:
      storing RSSIs of the plurality of nodes, based on signal-received times; and
      predicting link states using the stored RSSIs, said predicting the link states comprises:
         estimating a distance between the first node and the second node, a moving speed of the second node, and a moving start time point of the second node, wherein the moving start time point of the second node is estimated by averaging a time point when the signal is received in a final stationary state and a time point when the signal is received in a first moving state; and
      determining whether the second node moves; and
      communicating, by the first node with the second node according to a link state.

2. The communication method of claim 1, wherein the distance between the first node and the second node is estimated by a relationship wherein the RSSI of the received signal is inversely proportional to a square of a distance between the first and second nodes.

3. The communication method of claim 1, wherein determining whether the second node moves by determining whether the RSSI of the received signal has changed according to a time that the signal is received.

4. The communication method of claim 1 wherein the first node predicts that the second node moves away from the first node when the RSSI is reduced according to the signal-received time, and that the second node moves closer to the first node if the RSSI is increased according to the signal-received time.

5. The communication method of claim 1, wherein, if the second node moves out of a transmission range of the first node, the first node does not transmit a message to establish a route to the second node during the communication.

6. The communication method of claim 1, wherein, if the second node moves out of a transmission range of the first node and the first node receives a message to establish a route from the second node, the first node does not transmit the received message to the second node.

7. The communication method of claim 1, wherein, if the second node moves out of a transmission range of the first node then the first node communicates through a relay node to the second node, wherein the relay node is located within the transmission range of the first node and the second node.

8. A communication apparatus in a sensor network comprising a plurality of nodes,
wherein a first node of the plurality of nodes receives a signal transmitted from a second node of the plurality of nodes, at least once, and manages a link state with the second node according to a received signal strength indicator (RSSI) of the received signal, wherein the first node stores RSSIs of the plurality of nodes, based on signal-received times and predicts the link state using the RSSIs, wherein predicting the link state comprises;
estimating, by the first node, a distance between the first node and the second node, a moving speed of the second node, and a moving start time point of the second node, and determining whether the second node moves, wherein the first node estimates the moving start time point of the second node by averaging a time point when the signal is received in a final stationary state and a time point when the signal is received in a first moving state, wherein the first node communicates with the second node according to the link state.

9. The communication apparatus of claim 8, wherein the first node estimates the distance between the first node and the other node, using the relationship where a value of the RSSI of the received signal is inversely proportional to square of a distance between the first and second nodes.

10. The communication apparatus of claim 8, wherein the first node concludes that the second node moves if the value of the RSSI of the received signal is changed according to the time that the signal is received.

11. The communication apparatus of claim 8, wherein the first node determines that the second node is moving away from the first node if the value of the RSSI is reduced according to the signal-received time, and that the second node is moving closer to the first node if the value of the RSSI is increased according to the signal-received time.

12. The communication apparatus of claim 8, wherein, if the link state with the second node is weak, the first node does not transmit a message to establish a route to the second node.

13. The communication apparatus of claim 8, wherein, if the second node moves out of a transmission range of the first node and the first node receives a message to establish a route from the second node, the first node does not transmit the received message to the other nodes.

14. The communication apparatus of claim 8, wherein if the second node moves out of a transmission range of the first node then the first node communicates with the second node through a relay node wherein the relay node is located within the transmission range of the first node and the second node.

* * * * *